2,815,373
PREPARATION OF PARA-NITROBENZOIC ACID

George Mayurnik, Garfield, N. J., assignor to Robert S. Aries, New York, N. Y.

No Drawing. Application March 8, 1954, Serial No. 414,869

7 Claims. (Cl. 260—524)

This invention relates to improvements in the preparation of para-nitrobenzoic acid and, more particularly, it relates to improvements in the nitric acid oxidation of para-nitrotoluene to para-nitrobenzoic acid.

Para-nitrobenzoic acid has been prepared by nitration of toluene, separation of the para-nitrotoluene, and oxidation of the separated para-nitrotoluene with conventional oxidizing agents such as sodium dichromate, potassium permanganate, manganese dioxide, and the like.

This process is attended, however, by several disadvantages, viz., the high cost of the oxidizing agents and the difficulties in purifying the final product.

The present invention relates to an improved process for the synthesis of para-nitrobenzoic acid by oxidation of para-nitrotoluene with an oxygen containing gas. This is effected by heating a mixture of para-nitrotoluene and dilute nitric acid in a closed vessel and introducing air in the course of the reaction.

The following equations represent the probable course of the reaction of nitric acid on para-nitrotoluene:

(1)　　　　$2HNO_3 \longrightarrow H_2O + 2NO + 3O$ (2)

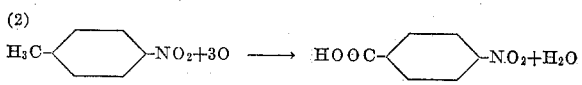

By admitting oxygen at controlled rates throughout the reaction period, reaction (1) is reversed and the nitric acid is regenerated. Theoretically, therefore, the oxidation is effected by the nascent oxygen, the nitric acid serving substantially as a catalyst. Consequently, the amount of nitric acid required for the oxidation is far less than the stoichiometric quantity indicated by reactions (1) and (2) and economies of nitric acid result. This treatment is of course theoretical, and is offered merely to explain the phenomena as actually observed.

The following comparative examples illustrate the advantages of effecting the oxidation in accordance with the present invention:

EXAMPLE I 137 grams of para-nitrotoluene (1.0 mole) and 820 grams of 25% nitric acid (3.25 moles 100% $HNO_3$) were heated in a stainless steel autoclave at 150–160° C. for one hour. The temperature was then gradually raised to 180° C. over a period of one hour and maintained at 180–185° C. for an additional hour to complete the reaction. The pressure was held at 275–300 pounds per sq. in. by venting of the gases when necessary. The reaction mixture was cooled and the precipitate comprising para-nitrobenzoic acid was filtered, washed with 200 cc. of water, and dried. The dry product weighed 150 grams and analyzed 99% para-nitrobenzoic acid.

EXAMPLE II 137 grams of para-nitrotoluene (1.0 mole) and 405 grams of 25% nitric acid (1.6 moles 100% $HNO_3$) were reacted as described in Example I. Throughout the reaction air was introduced into the autoclave at the rate of 1 liter per minute. The dry product weighed 159 grams and analyzed over 99% para-nitrobenzoic acid.

EXAMPLE III

The experiment described in Example II was repeated except that no air was introduced during the reaction. The resulting product consisted mostly of unreacted para-nitrotoluene which was removed by steam distillation. The para-nitrobenzoic acid was of poor quality and weighed only 32 grams.

A comparison of Examples I and II shows that a product can be produced in equal yield and purity with half as much nitric acid by introducing an oxygen containing gas during the course of the reaction. Example III constitutes a control experiment differing from Example I only in the amount of nitric acid and differing from Example II only in the absence of added air. It establishes conclusively that the advantages are the direct result of the introduction of the oxygen containing gas.

The use of oxygen containing gas therefore results in a five-fold increase in yield for the same amount of nitric acid, as can be seen from Examples II and III. In addition to economies of nitric acid, a considerable equipment saving per pound of product is realized since the same piece of apparatus is capable of producing far greater quantities of para-nitrobenzoic acid with a given volumn of reagents.

In place of para-nitrotoluene as starting material for the oxidation, an isomeric mixture of nitrotoluenes may be employed directly as obtained from nitration of toluene without separation of the isomers.

The para- isomer is preferentially oxidized to the corresponding acid while the ortho- isomer is practically unconverted and can readily be recovered by distillation. The meta- isomer is converted less readily than the para- isomer and the converted meta-nitrobenzoic acid can be separated readily from the para-nitrobenzoic acid by virtue of its greater solubility in water. Even without such purification, however, the crude para-nitrobenzoic acid is a satisfactory intermediate for many purposes without further processing.

In the following table, a comparison is given of the composition of nitrotoluene from nitration of toluene before oxidation with that of the nitrotoluene recovered after conversion of a portion to nitrobenzoic acid:

Table I
COMPOSITION OF NITROTOLUENE, WT. %

| Components | Before oxidation | After oxidation |
|---|---|---|
| Ortho | 60 | 97.0 |
| Meta | 4 | 1.5 |
| Para | 36 | 1.5 |

The unconverted nitrotoluene can be fractionated whereby a first cut amounting to about 85–90% of the total distillate and comprising about 99–99.8% ortho-nitrotoluene is obtained. The higher boiling fraction can be oxidized separately or it can be combined with a fresh mixture of nitrotoluenes and reprocessed.

To determine the relative reactivity of the several isomers of nitrotoluene, the following procedure was followed:

EXAMPLE IV

A mixture of 137 grams of nitrotoluene and 820 grams of 25% nitric acid was slowly heated to 160–170° C. over a period of thirty minutes with agitation in a stainless steel pressure vessel. After maintaining the temperature for thirty minutes, the mass was gradually heated to 180–185° C. and held at this temperature for one hour. The pressure within the vessel was maintained at 300–

325 pounds per sq. in. by venting gases liberated in the course of the reaction.

The autoclave was cooled and the contents distilled to recover unreacted nitrotoluene. During the distillation, water was introduced to replace that distilling off. The residual mixture was cooled to 10° C., filtered, washed with water, and dried.

Each of the isomers was reacted individually as described above and the results are tabulated below:

Table II

| Nitrotoluene | Nitrobenzoic acid, grams | Percent conversion | Nitrotoluene recovered, grams |
| --- | --- | --- | --- |
| Ortho | 35 | 21 | 88 |
| Meta | 104 | 62 | 46 |
| Para | 152 | 91 | 6 |

The following example illustrates the practice of a preferred embodiment of the invention:

EXAMPLE V

An isomeric mixture of 380 grams of nitrotoluene (60% ortho, 4% meta, 36% para) was heated with 450 grams of 25% nitric acid in an autoclave to a temperature of about 160° C. Introduction of 1.5 liters of air per minute was initiated and the temperature gradually raised to 180° C. The autoclave pressure was maintained at about 300 pounds per sq. in. by venting of gases. After an hour at the elevated temperature, the reaction vessel was permitted to cool and unreacted nitrotoluene was distilled off. Make-up water was introduced to replace that lost during the distillation. The distillation residue was filtered at 45° C., the filtrate boiled with 1500 grams of water, cooled to 45° C., again filtered, and dried. The product weighed 152 grams and analyzed over 99% para-nitrobenzoic acid. The unreacted nitrotoluene recovered by distillation analyzed over 95% orthonitrotoluene.

It has been found that the selective oxidation of the para-isomer extends to reactions wherein no oxygen containing gas is employed, although the advantages attending the use of such gas will not be realized. The process, however, effects the separation of isomers concurrently with the formation of para-nitrobenzoic acid, eliminating the necessity for effecting the separation prior to reaction by use of involved procedures.

The following examples are illustrative of this aspect of the invention:

EXAMPLE VI

A mixture of nitrotoluene isomers as obtained by nitration of toluene and containing 228 grams of the ortho-isomer. 15 grams of the meta isomer, and 137 grams of the para- isomer, was reacted with 915 grams of 25% nitric acid at 180° C. for one hour. The recovery procedure of Example V produced 145 grams of substantially pure para-nitrobenzoic acid. As before, the unreacted nitrotoluene ran over 95% ortho-nitrotoluene.

EXAMPLE VII

The oxidation of Example VI was repeated with the sole exception that 1500 grams of 18% nitric acid were employed as oxidizing agent. Comparable results were obtained.

EXAMPLE VIII

A mixture of ortho- and para-nitrotoluene weighing 380 grams and comprising 137 grams of the para- isomer was reacted with 820 grams of 25% nitric acid according to the procedure of Example VI. 150 grams of para-nitrobenzoic acid, M. P. 240–242° C., was recovered. The unconverted nitrotoluene weighed 241 grams and analyzed over 95% ortho-nitrotoluene.

Comparison of Example IV with Examples V, VI, VII and VIII establishes that not only is para-nitrotoluene oxidized by nitric acid more readily than the other isomers, but also that when a mixture of isomers is oxidized the para- isomer is converted selectively while oxidation of the other isomers is retarded so that a more complete separation of isomers than would have been expected from the data of Example IV is effected concurrently with preparation of para-nitrobenzoic acid.

The reaction conditions hereinabove employed are exemplary. Nitric acid concentrations of 10% to 60% may be employed but the preferred concentration for safe and economical operation without undue precautions is from 20% to 30%. At concentrations of less than 10% the volumes are too large for economical operation and the reaction proceeds too slowly. At concentrations above 60% the reaction is too violent for safe operation and nitration may occur. The molar ratio of nitric acid (based on 100% $HNO_3$) to para-nitrotoluene may vary from 1 to 10 although the preferred range is 1.5 to 3 when employing an oxygen containing gas. In the selective oxidation without an oxygen containing gas, as illustrated in Examples VI, VII and VIII, a slightly higher ratio of 2 to 4 is preferred. With lower quantities of nitric acid the oxidation is not sufficiently complete for economical operation. Larger quantities are not required and are not employed for reasons of economy and safety; such quantities are wasteful and serve to decrease the capacity of the equipment.

At temperatures below 140° C. the reaction is too slow and at temperatures above 210° C. low yields are obtained, probably due to rupture of the molecule. These higher temperatures also promote nitration which complicates the recovery and reduces the yield. Therefore, while temperatures of 140° C. to 210° C. may be used, the preferred temperature range lies between 160° C. and 185° C.

Any pressure above the vapor pressure of water at the prevailing temperature is suitable for the reaction.

The reaction may be effected batchwise, in which case one or more of the reactants may be introduced continuously. Alternately, all of the materials may be introduced continuously, a portion of the contents being withdrawn continuously and processed for isolation of the para-nitrobenzoic acid values. The continuous process may be varied by withdrawing a portion of the reactants intermittently for processing of the acid formed.

The preferred oxygen containing gas is air although pure oxygen may be employed as well. Any oxygen containing mixture of gases may be employed so long as the other components are inert with respect to the reaction.

The rate of introduction of oxygen is dependent on the rate of reaction. At the early stages of the reaction when the reaction rate is greatest the oxygen containing gas should be introduced in large quantity. Towards the end of the reaction the rate may be correspondingly decreased. At any given time during the reaction it can readily be determined if sufficient oxygen is being supplied; if the exit gases are colored upon mixing with air it indicates the presence of NO and the rate of air introduction should be accordingly increased. When air is being introduced in suitable quantity there will be substantially no free NO available and the exit gases upon mixing with air will be substantially colorless. A suitable molar range of oxygen to para-nitrotoluene constitutes at least 1.5 up to about 10 although even higher ratios may be employed.

Various changes and modifications may be made without departing from the spirit and scope of this invention and it is intended that such obvious changes and modifications be embraced by the annexed claims.

I claim:

1. The process for the preparation of para-nitrobenzoic acid which comprises reacting with nitric acid in the presence of an oxygen-containing gas an isomeric mixture of o-, m- and p-nitrotoluenes obtained by nitration of toluene without separation of the isomers, whereby the para-nitrotoluene is selectively converted to para-nitrobenzoic acid.

2. The process for the preparation of para-nitrobenzoic acid which comprises reacting with nitric acid in the presence of an oxygen-containing gas an isomeric mixture of o-, m- and p-nitrotoluenes obtained by nitration of toluene without separation of the isomers at elevated temperatures, separating unconverted nitrotoluene, and recovering the residue of paranitrobenzoic acid.

3. The process for the preparation of para-nitrobenzoic acid which comprises reacting with about 20–30% nitric acid an isomeric mixture of o-, m- and p-nitrotoluenes obtained by nitration of toluene without separation of the isomers, the nitric acid being present in a molar ratio of about 1.5–3 based on para-nitrotoluene, introducing air in the course of the reaction while maintaining a temperature of about 160–185° C. and a pressure in excess of the vapor pressure of water at the prevailing temperature, distilling unreacted nitrotoluene from the reaction mass, and recovering the residue of para-nitrobenzoic acid.

4. The process according to claim 3, wherein water is added in the course of the distillation and the residue after distillation is cooled to separate the para-nitrobenzoic acid.

5. The process for the preparation of para-nitrobenzoic acid which comprises reacting with nitric acid at elevated temperatures an isomeric mixture of o-, m- and p-nitrotoluenes obtained by nitration of toluene without separation of the isomers, separating unconverted nitrotoluene, and recovering the residue of para-nitrobenzoic acid.

6. The process for the preparation of para-nitrobenzoic acid which comprises reacting with about 20–30% nitric acid an isomeric mixture of o-, m- and p-nitrotoluenes obtained by nitration of toluene without separation of the isomers, the nitric acid being present in a molar ratio of about 2–4 based on para-nitrotoluene, maintaining a temperature of about 160–185° C. and a pressure in excess of the vapor pressure of water at the prevailing temperature, distilling unreacted nitrotoluene from the reaction mass, and recovering the residue of para-nitrobenzoic acid.

7. The process according to claim 6, wherein water is added in the course of the distillation and the residue after distillation is cooled to separate the para-nitrobenzoic acid.

References Cited in the file of this patent
UNITED STATES PATENTS

| | | |
|---|---|---|
| 1,488,730 | Beall et al. | Apr. 1, 1924 |
| 1,546,191 | Beall et al. | July 14, 1925 |

OTHER REFERENCES

Askenasy et al.: Liebig's Annalen, vol. 461, pp. 123–4 (1928).

Oda et al.: Chem. Ab., vol. 44, col. 4874 (1950).

Oda et al.: Chem. Ab., vol. 44, col. 6397 (1950).